United States Patent [19]
Hodgson

[11] Patent Number: 5,857,645
[45] Date of Patent: Jan. 12, 1999

[54] CROWN BALLOON SYSTEM

[76] Inventor: Frank L. Hodgson, 708 Matadero Ave., Palo Alto, Calif. 94306

[21] Appl. No.: 783,035

[22] Filed: Jan. 14, 1997

[51] Int. Cl.$^6$ ....................................................... B64B 1/64
[52] U.S. Cl. .................................. 244/33; 244/31; 244/62
[58] Field of Search ................................. 244/24, 30, 31, 244/33, 62, 115, 116; 212/71

[56] References Cited

U.S. PATENT DOCUMENTS

| 541,102 | 6/1895 | Lomax | 244/33 |
|---|---|---|---|
| 1,017,200 | 2/1912 | Brackett | 244/33 |
| 2,365,778 | 12/1944 | Schwab | 244/33 X |
| 3,270,895 | 9/1966 | Stewart | 244/33 X |
| 4,055,316 | 10/1977 | Chipper et al. | 244/33 |
| 4,581,897 | 4/1986 | Sankrithi | 244/33 X |
| 4,640,474 | 2/1987 | Manseth | 244/33 X |
| 5,080,302 | 1/1992 | Hoke | 244/33 X |

Primary Examiner—William Grant

[57] ABSTRACT

A helium balloon transport system comprised of two separate helium balloon clusters (31) with underslung framing (2, 3, 4, 21) for use with two separate balloons (15) of comparable size, the entire system being interconnected (19) with moorings (16) to the ground (20) and having a gross lift of roughly 10,000 pounds. Power is provided by photovoltaic cells (5) augmented by rechargeable batteries (23). Travel is normally realized by throwing out grapples (26) and by winching (24) toward these fixed points (20). Free flight is reserved for emergency situations. The underslung framing (4) is rotatable to give a level configuration which when close to the ground in a jungle or forest allows for the avoidance of the damaging effects of high winds. The configuration is capable of use for travel upwind. The system may be used as a residence by more than a dozen persons over inhospitable regions to include swamps, jungles and dense forests for extended periods of time, for disaster relief or to establish a military presence.

20 Claims, 9 Drawing Sheets

CROWN BALLOON SYSTEM

FIELD OF INVENTION

This invention relates generally to balloon transportation devices and more particularly to helium filled balloon systems. These are relatively large balloons, being in excess of 25 foot in diameter and being utlilized in clusters. Although such a system can be used to transport commercial loads from point to point, the primary use of the system is as a transportation device which affords access to inhospitable regions for exploration and scientific study. The unique ability to transport people and equipment on a routine basis for prolonged residence in hostile regions makes the system a flexible and unique system. It is also a very special working environment for its inhabitants.

The invention invisions usage of the system by throwing out grapples and winching toward the fixed points thus secured. Free flight of the system is to be utilized only as an emergency mode of travel. The system as described can put 16 persons with support equipment into jungle or subartic forested regions for up to 1 year with periodic resupply by various means to include helicopters.

The preferred embodiment of the system is to utilize underslung framing to distribute the loading and to reduce the overall height of the system. Two clusters of 6 balloons with two separate, but tethered, balloons of comparable size for a total of 14 balloons constitute a system. Such a system is preferred for reasons of safety and for overall efficiency. The separate balloons are used to inspect, clean and repair each other and the balloon clusters. They are also used to free tangled grapples. Onboard electric power is supplied by photovoltaic cells situated on the tops and upper sides of all 14 balloons. They can produce about 60 kilowatts of power. Additional power can be obtained from the winches when traveling downwind. Power is also stored by using onboard battery systems. The low compact design of the system allows the configuration to stay close to the ground. By means of articulating power saws the vegetation below a cluster can be cut away to allow it to be lowered below the wind line to escape high winds. In such a position, winds up to 70 mph should not be a problem. Such winds would be disasterous for ordinary lighter-than-air craft caught in the open, particularly when seeking a hanger. The gross lift of the system in the preferred embodiment is about 10,000 pounds with a minimum overall height of about 37 feet.

PRIOR ART

No prior art can be found which directly or indirectly discloses the present invention. Existing transport systems which obliquely parallel some aspects of the objectives of the present invention are as follows:

Routine and continuous access to forest and jungle canopies currently utilizes fixed platforms or mountain climbing techniques with loads and persons suspended by ropes or cables. Access with helicopters requires optimum weather conditions and very good pilots. These flights tend to be of short duration with limited access and involve the creation of substantial downwashes of air currents. The use of balloon systems which travel while in continuous contact with the ground or with a water surface is unknown.

Balloons classically have been used as toys, for advertisement from a height, for free flight with or without propulsion, to carry distress signals, as military barrage balloons, in configurations such as dirigibles or blimps and for observation. There is one example of using a railroad car to reposition a tethered balloon.

In general, the prior art emphasizes the use of single balloons or inflated structures together with their aerodynamics, propulsion, flight characteristics and physical structure. No prior art discloses the use of photovoltaic cells for power, the use of tethered travel using winches and grapples or the use of two or more of such units as an integrated system. No system has been suggested which utilitzes separate but tethered single balloons to assist the main units by way of inspection, cleaning and repair. Most critically, no prior art stresses the key combination of high lift and a squat or low profile. No prior art stresses the launching of grapples or sea anchors from balloons as a critical part of travel, nor the cutting of vegetation from beneath a ballon configuration to allow it to be lowered below treetop height so as to avoid high winds.

No prior art stresses the use of internal support lines within the balloons to obtain a substantially spherical shape so as to further minimize height. No prior art stresses the great advantage obtained by using two or more units which makes travel much more efficient and much safer. No prior art stresses the use of separate ballons to release grapples. No prior art stresses the portage of liquid helium containers as a source of makeup helium gas to extend the time of residency in remote regions.

Forested mountainous terrain is the preferred type of region for the use of this system. Ordinary lighter-than-air systems tend to fair best in open areas particularly when landing or when being launched. The open areas near and about hangers for these craft are particularly unsuited to the present invention. This fundamental difference in usage speaks to the novelty of the concept and to the novelty of the capabilities of the system.

In summary, the prior art, aside from use as toys, narrowly focuses on (1) static usage, or (2) free flight with or without power.

It is the recent availability of modern technologically new elements which are cheaper, lighter in weight, more compact, more efficient and/or commercially available that has precluded the creation of a commerically viable system of this type until now. Even five years ago this application would not have been commercially viable. The inventor has examined the details of design for this system over the past 16 years and only recently has he concluded that all of the needed elements are available or are capable of fabrication so as to have a reliable and commercially viable system.

SUMMARY OF THE INVENTION

It is a general object of the present invention to provide an improved lighter-than-air device for the transport of a load.

It is another object of the present invention to utilize clusters of helium balloons to achieve a substantially squat or minimum height while maximizing lift.

It is another object of the present invention to provide a transportation means while in contact with the ground or with a water surface by utilizing grapples or sea anchors which are launched from the system to distant points and from which points the system may be moved by winching.

It is a further object of the present invention to use the system to transport loads to include persons to afford direct access to the canopies of forests and jungles and to the ground or water thereunder on a routine basis in remote and inhospitable regions.

Briefly, the preferred embodiment of the present invention is a system of two interconnected balloon clusters with two separate, but tethered, balloons all of which are organized to permit travel in miserable weather, day or night, in fog, near cliffs, over bogs, quicksand, unstable and avalanche prone regions, and/or over permafrost in subartic forested regions. The balloon clusters are each composed of six helium balloons roughly 27 foot in diameter, the three center balloons supporting a triangular frame at its corners. Three pivot frames are rotatably attached to the corners of said triangular frame with their outer ends each attached to another balloon. Said pivot frames can be held level to give a flat configuration of six balloons or they can be rotated upward to give a stacked 3 over 3 arrangement. A central platform is situated below and central to said triangular frame from which it is supported with corner framing inboard to and below each corner of said triangular frame. Said corner framing also houses winches and their motors which are used to move the system from one location to another. Grapple or sea anchor means are placed or thrown to a distance to allow said winching. The center of said central platform has two upward opening doors in its center, miller's doors, to allow a load or person to be raised up to or lowered from the platform. The platform can be enclosed and has partitioned sides each of which can be let down to a level positon or to a fully downward position. Safety nets are strung below each balloon cluster. The separate balloons each have a sling underneath which supports a person and a load. Enclosed sleeping quarters, elongated containers, are situated on the top of each side of the triangular frame. The centers of said pivot frames can also be used as sleeping quarters when they are in the level position. Three cantilevered structures are placed outboard of the corners of said triangular fame so as to clear the pivot frames when they are rotated. Two of these are used to house utility equipment which includes an air compressor in one and air conditioning equipment in the other. The third utility box is larger and is used as a small command center. The command center on each unit also has a shower and a toilet.

The preferred embodiment of the system as set out above utilizes a water distillation unit on each cluster with the water being used for human consumption, makeup water for supporting equipment and for ballast. Other needled equipment includes communications equipment, navigation equipment, liquid helium containers, and an electric power distribution network.

The use of photovoltaic cells and batteries give a weight-stable configuration as compared with fuel powered systems. This is a distinct advantage over existing systems both for short trips and for extended travel. For a given weight, the use of winches with permanent magnet motors is much more efficient than any other means of powered travel. The advantage of the present invention is its great flexiblity of use. It is like a truck for the jungle. The configuration disassembles for shipment by air cargo plane, ship, rail transport and/or by trucks. To appreciate the significance of the present invention it is necessary to stress the staying power of the system at remote sites and to view the rate of travel, 10 to 20 miles a day, in terms of ground travel rates over the same terrain with comparable loads and with comparable safety.

Although the description above contains many specificities, these should not be construed as limiting the scope of the invention but as merely providing illustrations of some of the presently preferred embodiments of this invention. For example, the underslung framing can be of a different shape; balloons of substantialy different sizes can be used; rotation of the framing is not essential to the functioning of the system; more or fewer personnel can be used; specialized equipment such as coring and drilling equipment can be added to the system; substantially larger or smaller balloons in varying combinations can be used. Thus the scope of the invention should be determined by the appended claims and their legal equivalents, rather than by the examples given.

SPECIFICATION

Best Mode for Carrying Out Invention

Figure 7:
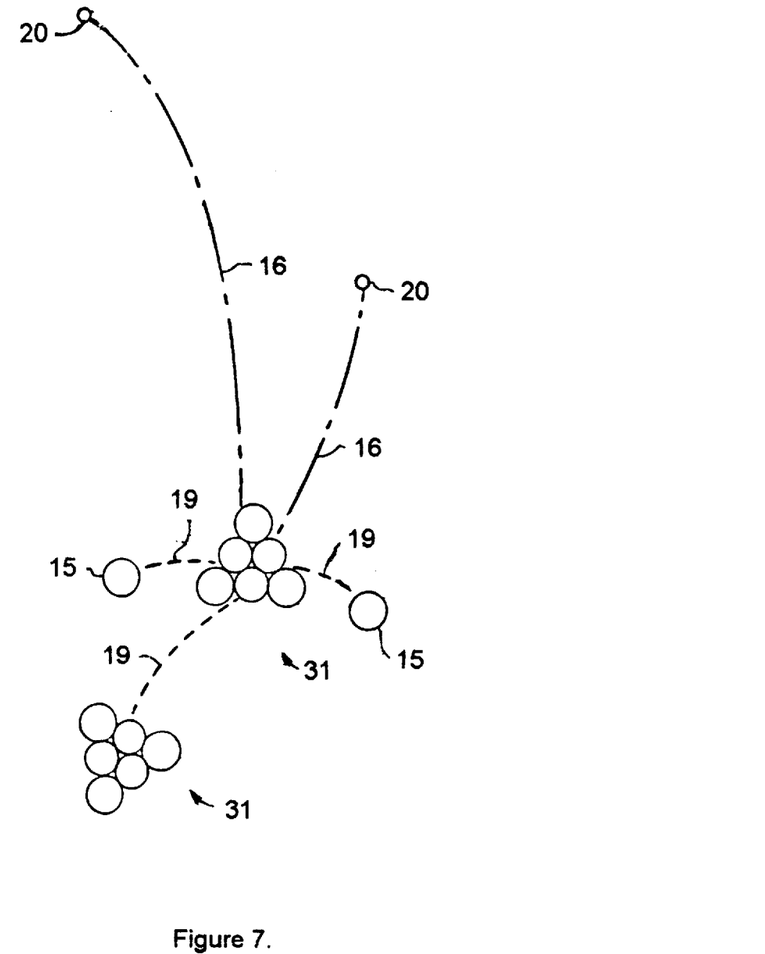
FIG. 7 is a plan view of the entire system of 14 balloons comprising two balloon clusters and two separate but tethered balloons, the entire system being interconnected and secured by two mooring lines to the ground.

The best presently known mode for carrying out the invention is the crown balloon system, a clustered configuration of helium balloons. Referring particularly to the figures wherein like-referenced numbers have been applied to like-parts throughout the description, a balloon cluster being designated by the general reference character 31 in FIG. 1. The underslung framing is designated by the general reference character 38 in FIG. 1. The preferred embodiment of the present invention is two balloon clusters 31 interconnected with two separate balloons which are each designated by the general reference character 15, as shown in FIG. 7. In the stacked three over three configuration shown in FIG. 1, a balloon cluster 31 has a minimum width. In the flat configuration shown in FIG. 2 a balloon cluster 31 has a minimum height of about 37 feet. The average balloon size is about 27 foot in diameter giving a gross lift for 14 balloons of roughly 10,000 pounds. The compliment of persons onboard normally does not exceed 16.

Figure 1:
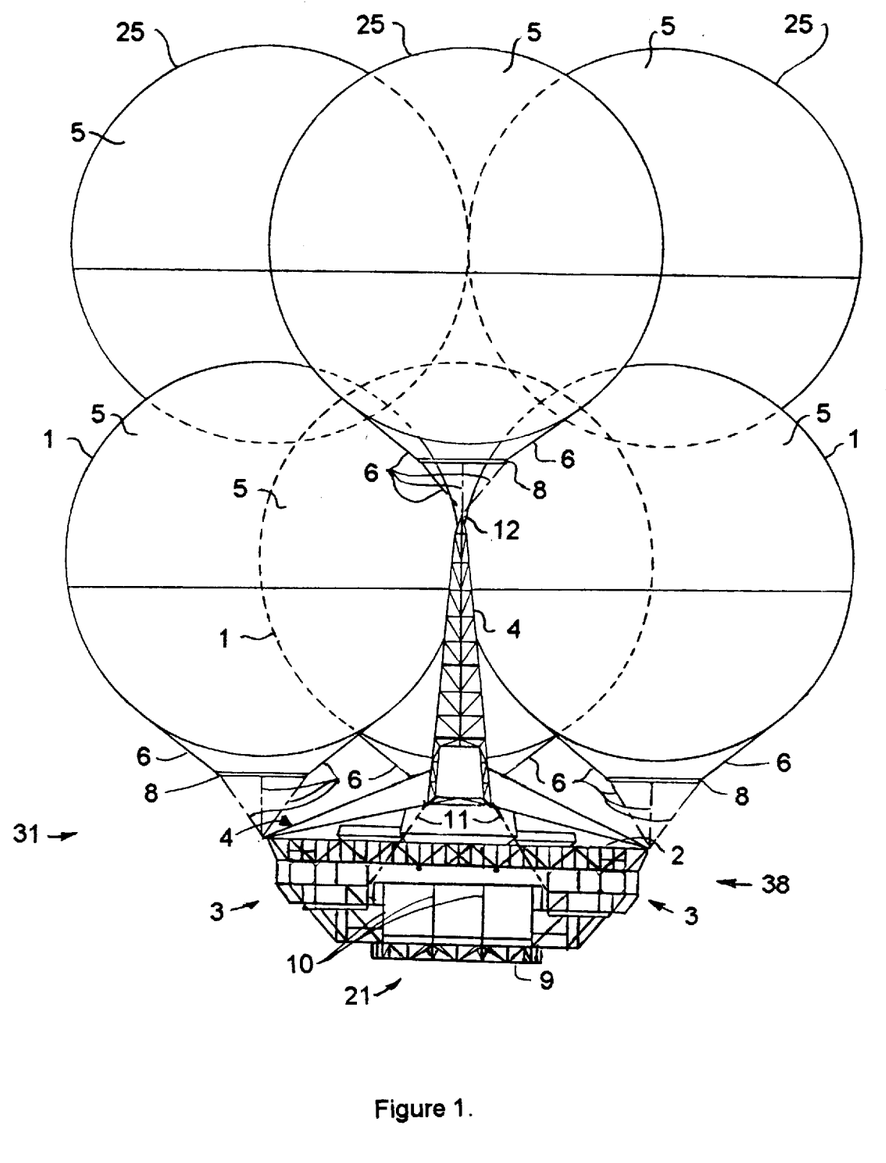
FIG. 1 is a side view of a balloon cluster of 6 balloons with underslung framing in the stacked 3 over 3 configuration.
Figure 2:
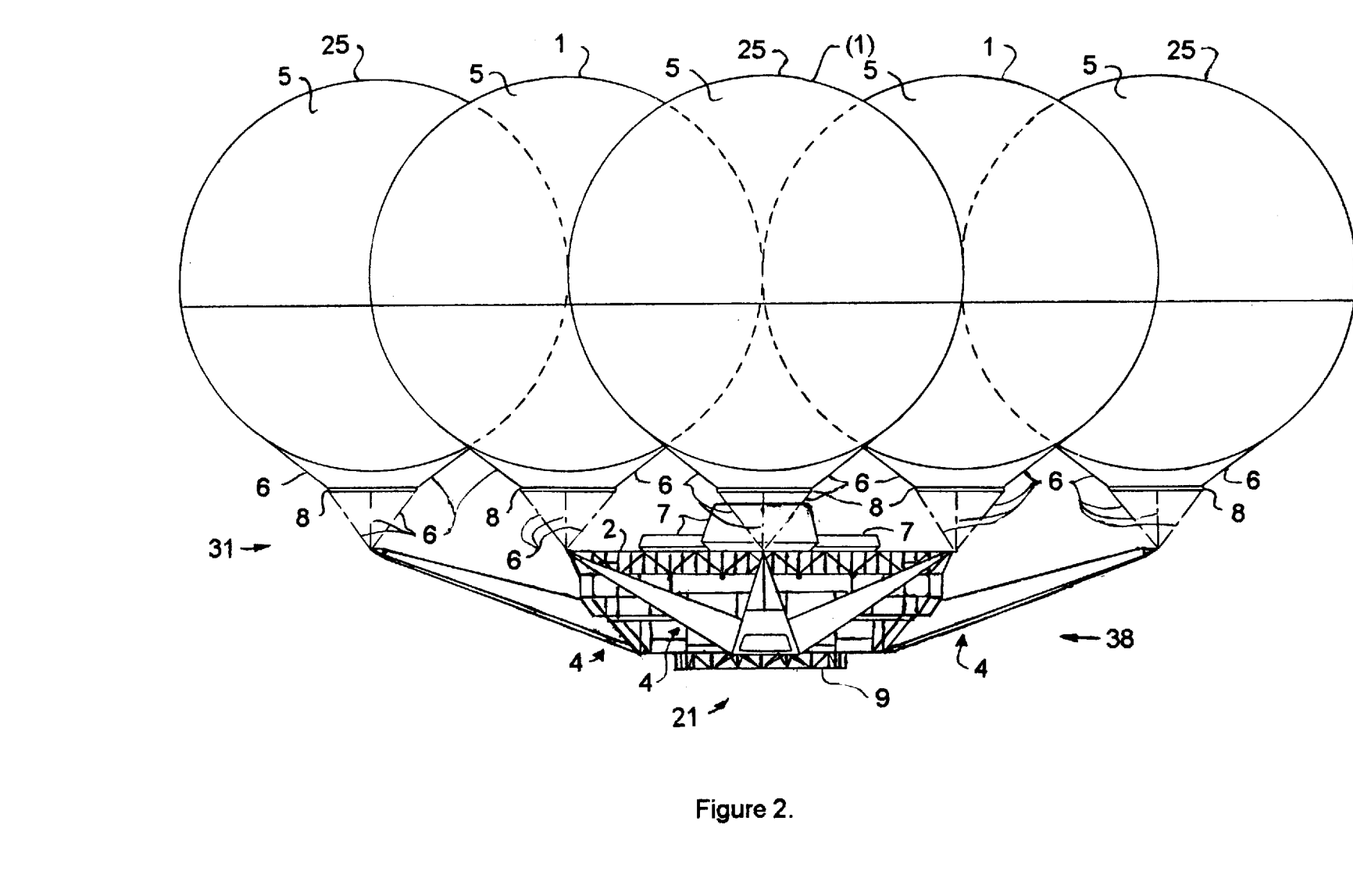
FIG. 2 is a side view of a balloon cluster as in FIG. 1 with the pivot frames holding the outer balloons level with the three center balloons.
Figure 3:
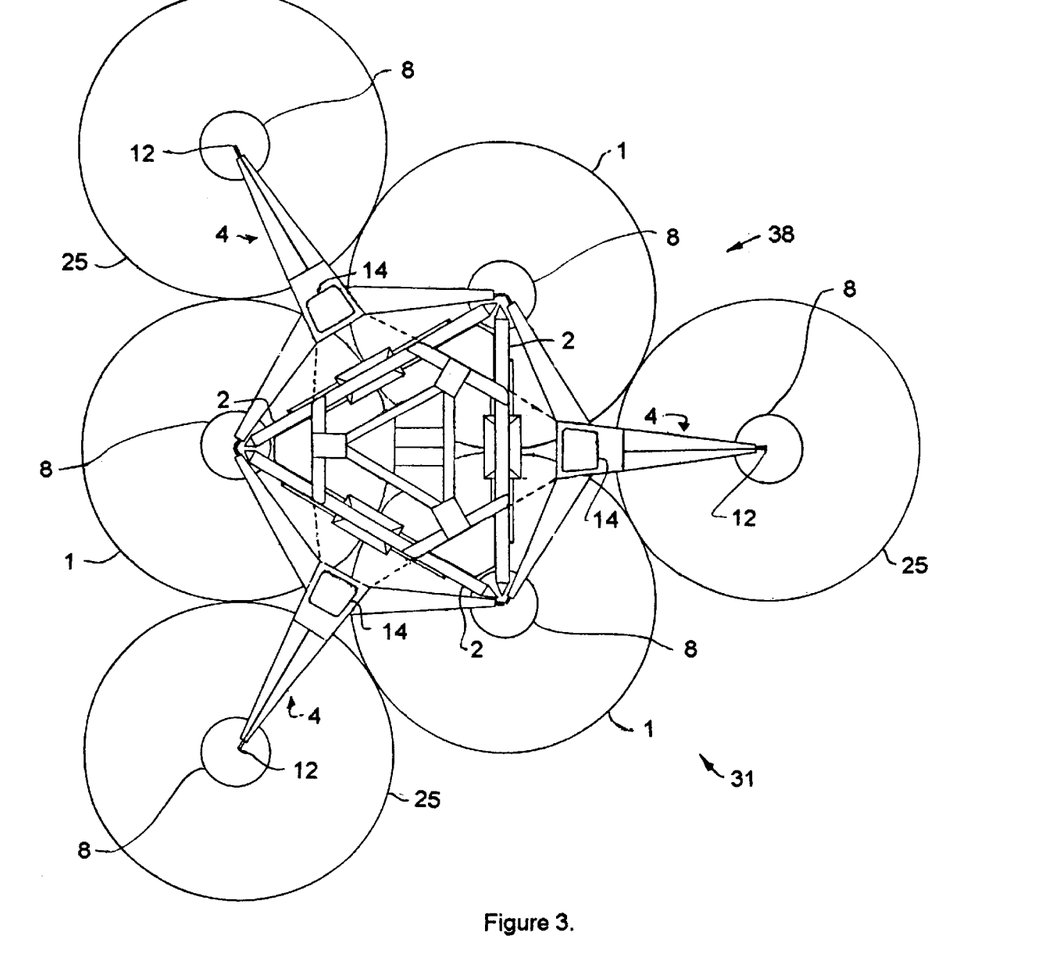
FIG. 3 is a bottom schematic view of FIG. 2.
Figure 4:
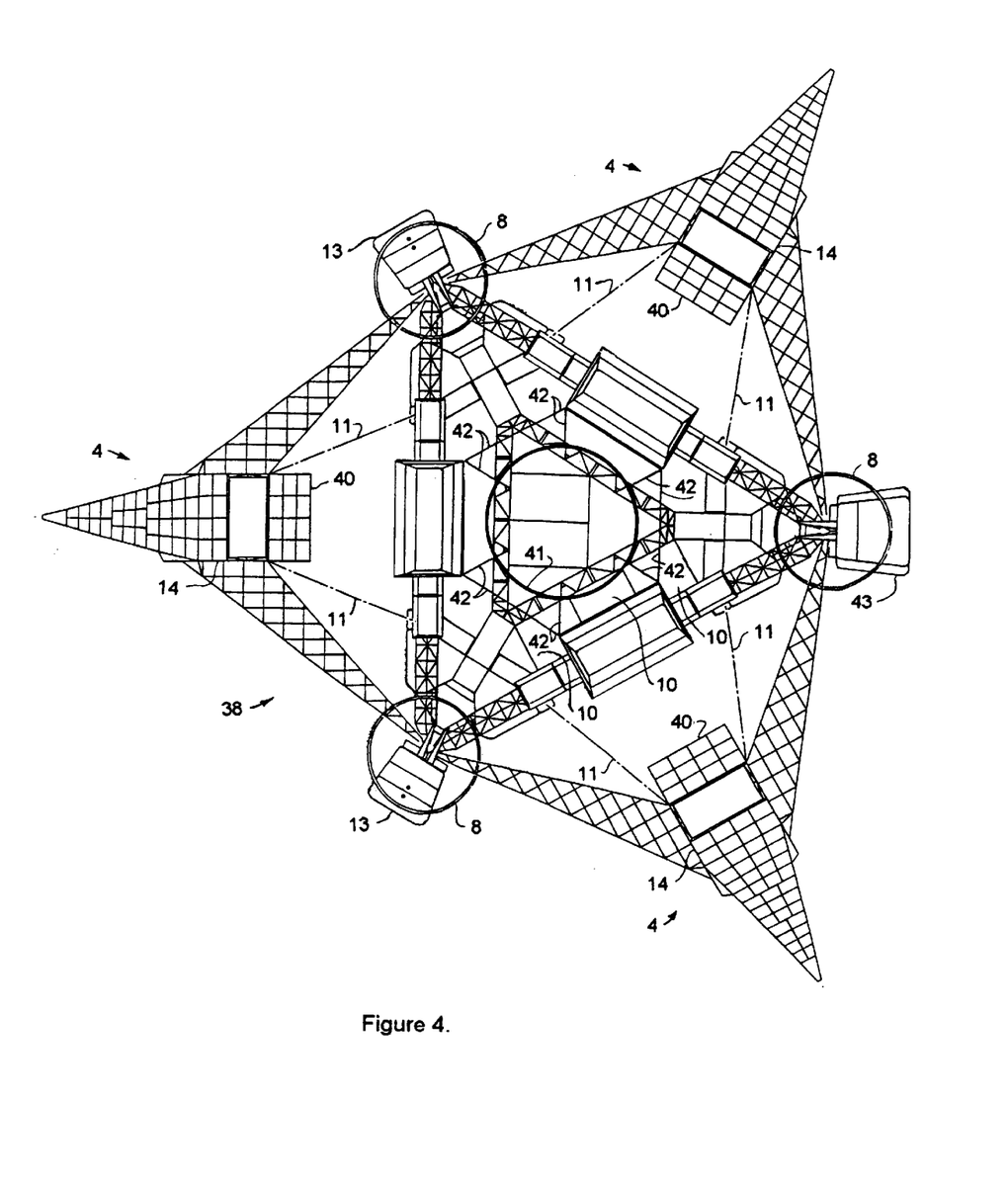
FIG. 4 is a plan view of a unit, a cluster of 6 balloons in the flat configuration shown with 3 side walls on one side of the center platform lowered down to a level position.
Figure 5:
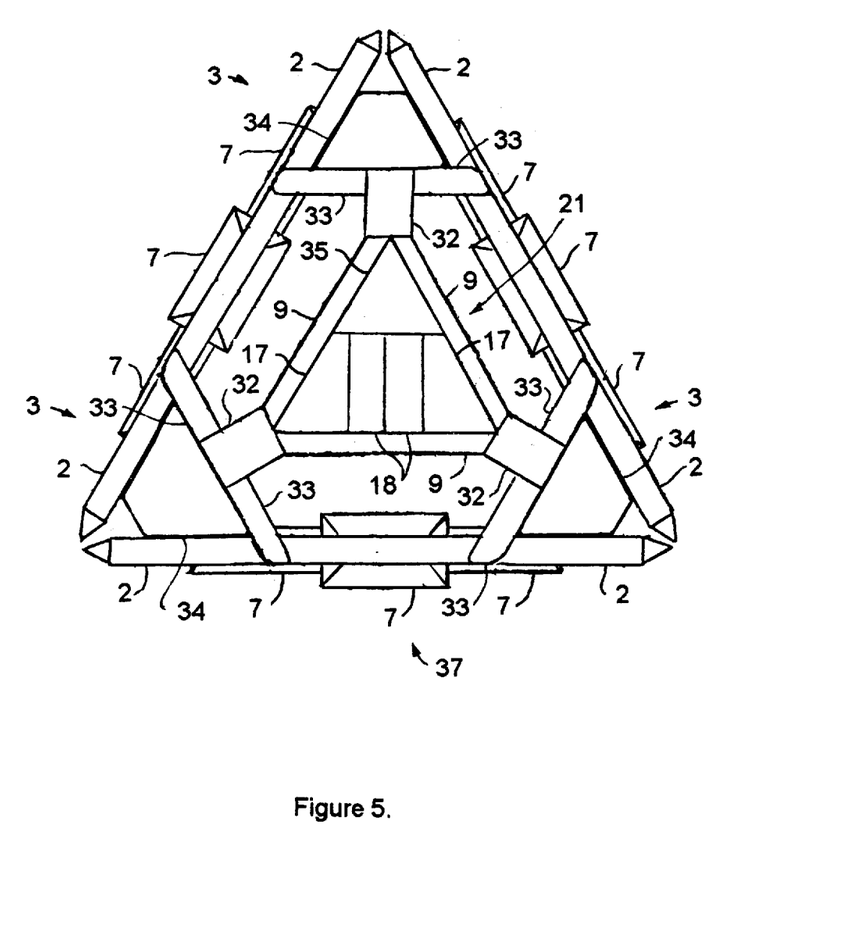
FIG. 5 gives a schematic bottom view of a unit, as shown in FIG. 3, but only the triangular platform, triangular frame and the elongated containers.

Three center balloons 1 support the corners of a triangular frame designated by the general reference number 37 which is formed by three top frames 2 as shown in FIG. 5. The three pivot frames which are each designated by the general reference number 4 are shown in FIGS. 3 and 4 can be independently rotated and fixed in convenient positions relative to the triangular frame 37 as shown in FIGS. 1, 2, 3 and 10. When a pivot frame 4 is level, its central compartment 14 can be used as a sleeping berth as shown in FIG. 4. A top access door 40 allows access to said central compartment 14. The support points 12 of said pivot frames 4 are each attached to an outer balloon 25. Each corner formed by said top frames 2 is connected to a corner frame designated by the general reference character 3 which is connected to and supports an end box 32 which in turn is connnected to and supports a center platform designated by the general reference character 21. Each of said corner frames 3 is composed of a winch compartment 34, which in the preferred embodiment of the present invention contains a pair of winches and motors 24. Said pair of winches face outward, one on each side of said corner frame 3. Supporting means 11 from either side of said pivot frames 4 attach to said corner frames 3 near walkways 33 as shown in FIGS. 1, 3 and 4. Said supporting means 11 can be varied in length to permit repositioning of said pivot frames 4.

Said center platform 21 is composed of three key frames 9 which form its outer edges, into the center of which is built two wing boxes 17 and a top box 35 to house equipment and/or batteries 23. A pair of miller's doors 18 are built into the floor of the center platform 21 which open upward for the convenient transfer of a load or person up to or down from said center platform 21. Said center platform 21 also has three side wall pieces 10 on each of its three sides which can be let down independently straight down or to a horizontal position to form an extension of said center platform 21 as shown in FIG. 4. Said balloons 1 and 25 are each attached to the underslung framing 38 by connection means 6 with an interposed balloon ring 8 as shown in FIG. 1.

Figure 6:
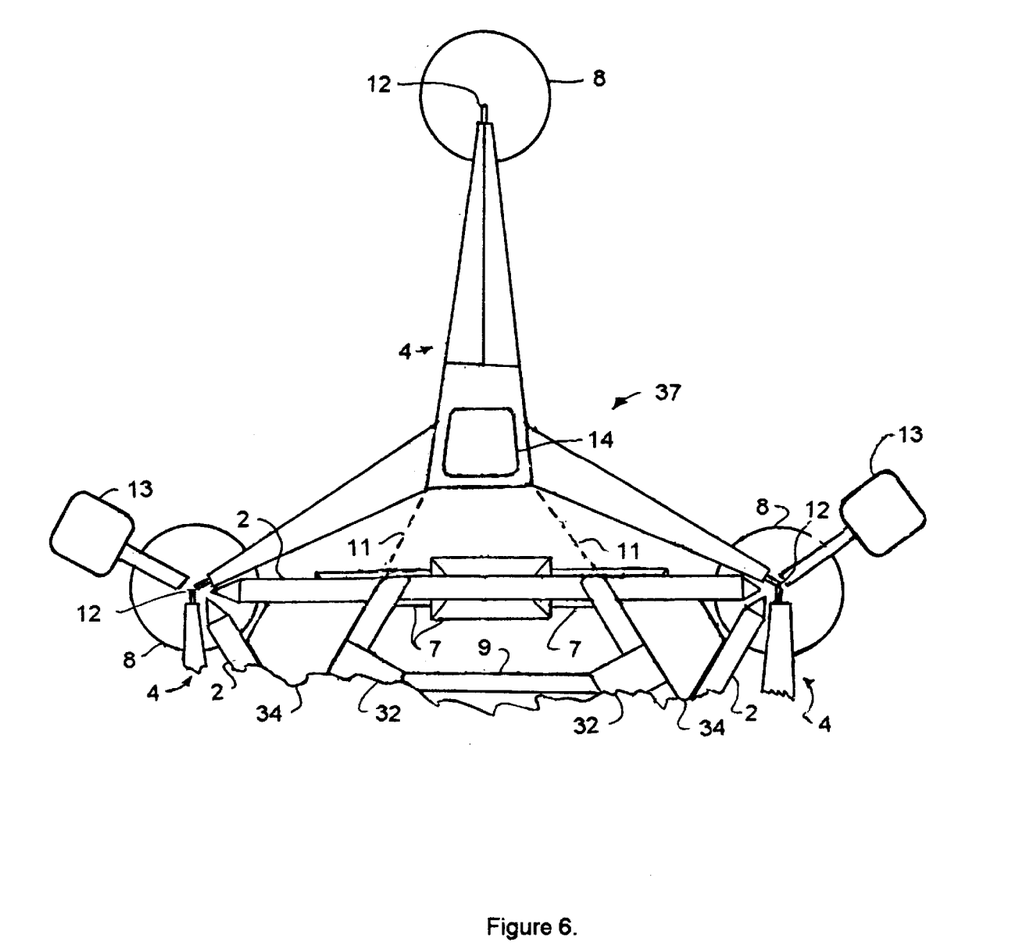
FIG. 6 gives a schematic bottom view of FIG. 2, as shown in FIG. 3, but only the detail of one pivot frame, a portion of the triangular frame, a portion of the triangular platform, one elongated container, two cantilevered structures and two balloon rings.

Elongated containers 7 are located on the top of each of said top frames 2. The underslung framing 38 of one balloon cluster 31 thus can accommodate 6 persons in separate sleeping berths 7, 14. Additional sleeping means such as hammocks can be utilized over the center platform 21 or elsewhere from or on the underslung framing 38. Two cantilevered utility boxes 13 as shown in FIG. 6 are supported outboard of the corners of the corners of said triangular frame 37 so as to clear said pivot frames 4 when they are rotated. An air compressor is housed in one utility box 13 and an air conditioning unit is housed in the other utility box 13. A third cantilevered structure, a command center, 43 is larger and contains a shower and toilet.

A top ring 41 is supported above the center platform 21 by top ring frames 42 from the top frames 2. The top ring 41 is useful for the support of equipment and for enclosing the center platform 21. The top ring 41, said top ring frames 42, said elongated containers 7 and the three said central balloons 1 can be released in an emergency as a single unit. A separate thin hellum-barrier film 39 shown In FIG. 9 compliments the tougher thicker outer layer which forms and gives strength to a balloon. Said helium-barrier film 39 is preferrably composed of suitably strengthened EVOH which is a barrier to the escape of helium from a balloon. Two polyethylene films sandwiching the EVOH layer provides suitable strength to the composite helium-barrier film 39.

Figure 8:
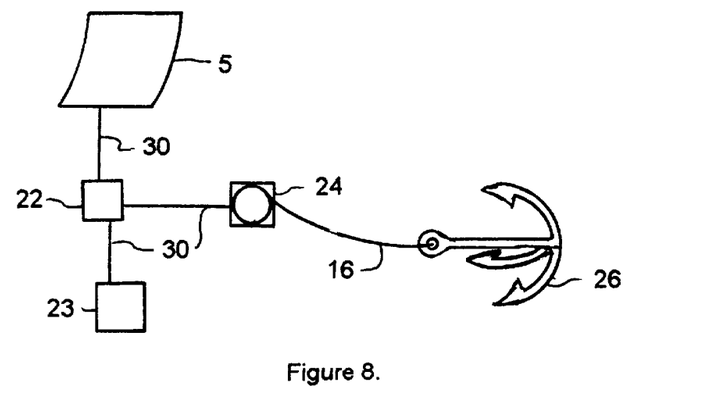
FIG. 8 shows a schematic view of photovoltaic cells, batteries, a winch and its motor together with its electrical connections and controller. It also shows a mooring line and grapple.
Figure 9:
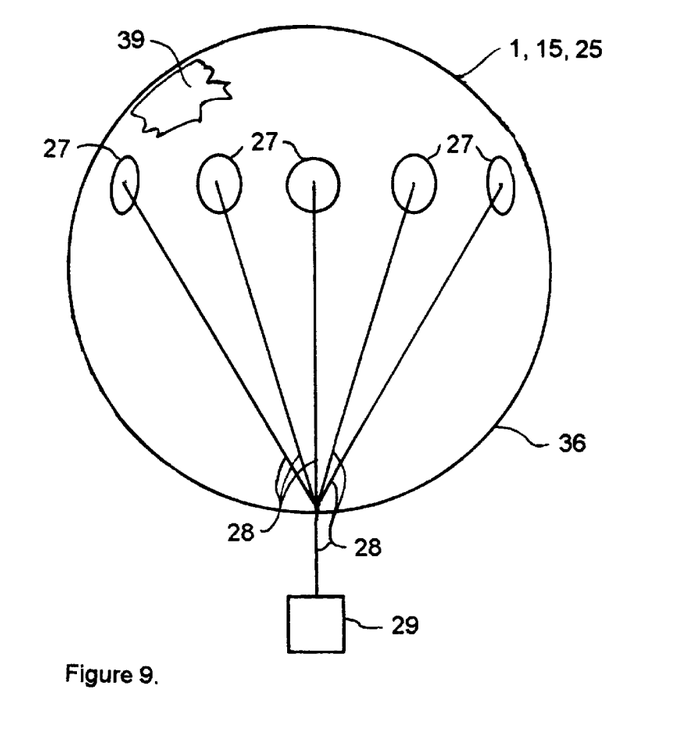
FIG. 9 shows, in cross section, through the center, a side interior view of a balloon with a series of reinforced areas which give partial support to the base of the balloon and a load thereunder so as to give a substantially spherical shape to the balloon.

FIG. 7 shows the system, fourteen balloons in all, with two balloon clusters 31 together with two separate balloons 15, all interconnected with said attachment means 19, with mooring means 16 to the ground 20 in a typical system configuration. Each balloon 1, 15, 25 has a sheet of photovoltaic cells 5 on its top and upper sides. In the tropics, the normal average output of the system's photovoltaic cells at noon is about 60 kilowatts. FIG. 8 shows a schematic view of said photovoltaic cells 5, said batteries 23, controlling means 22 and said winch and motor 24 together with electrical interconnection means 30, securement means 16 and a grapple 26. The means for moving the system of 14 balloons is by winching toward fixed points secured by grapples which have been thrown or placed at a distance. FIG. 9 shows, in cross section, through the center, a side interior view of a balloon 1, 15, 25 with reinforcing means 27 allowing connecting means 28 which passes through the balloon surface 36 to support a load 29. Ballast containers can be suspended conveniently, at the bottom, inside of the balloons 1, 15, 25 by these connecting means 28. These connecting means 28 also make the balloons substantially spherical in shape.

The underslung framing 38 should be as light as possible and suitable materials such as aluminum or titanium alloys and/or composite materials are to be used in the preferred embodiment. The separate balloons 15 are used to inspect, clean and repair each other and the balloon clusters 31. The two separate balloons 15 each have a sling underneath to support a person plus a load. The low height of a balloon cluster 31 when in the flat configuration allows it to be lowered into a forest to avoid high wind conditions. This can be accomplished by cutting away the vegetation below a balloon cluster 31. Power saws can be rigged below the balloon clusters 31 and below the separate balloons 15 to permit this type of clearance and to assist in freeing fouled grapples 26.

Figure 10:
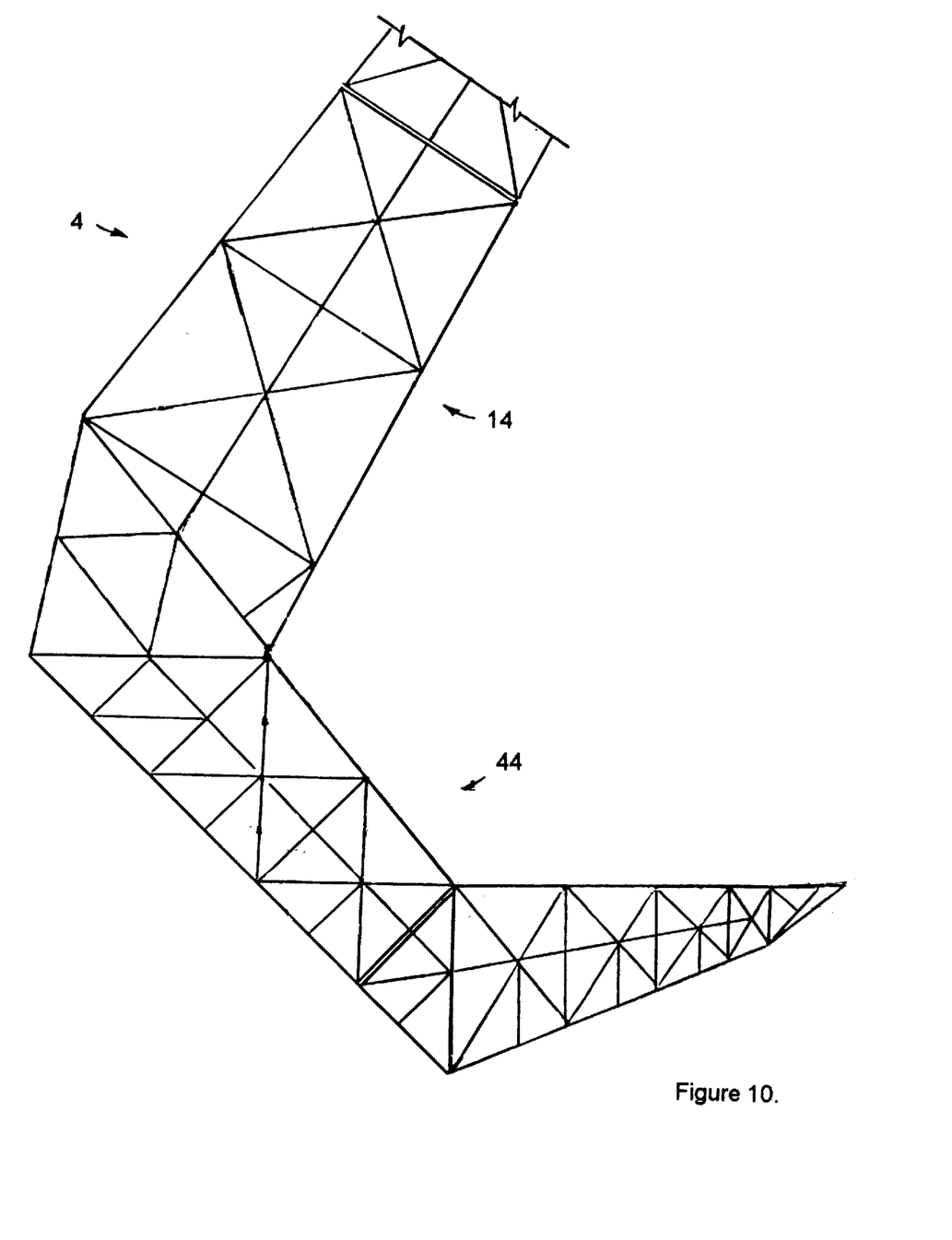
FIG. 10 shows, in cross section, a pivot frame partially raised from a level position with framing affixed under the center compartment which extends below it and outward and upon which a person and equipment can be situated so as to have a clear outboard perspective.

When all of the pivot frames 4 are rotated roughly half way between the stacked 3 over 3 position and the flat configuration, the balloon cluster assumes a position which is termed the crown position which derives its name from the fact that alternate balloons in a cluster are somewhat higher. FIG. 10 shows this position for one pivot frame 4 plus the framing below the center compartment 14 which is termed the gunner's platform 44. The gunner's platform 44 provides a position from which grapples and lines can be conveniently launched to a distant point. This can be done with existing technology which includes a hand thrown line and grapple, rocket propulsion, use of a kite or a balloon, and propulsion by a gun or by elastic means. There are advantages and disadvantages to each method. The elastic means method however is the current preferred method. When the pivot frame 4 is in this crown position, access from the center compartment 14 to the gunner's platform 44 is required and suitable means in the front of the compartment is thus needed as is shown in FIGS. 1, 2, 3 and 6.

As would be obvious to one skilled in the art, the preferred embodiment of the system utilizes a water distillation unit on each ballon cluster with the water being used for human consumption, as makeup water for supporting equipment and for ballast. Other needed equipment includes communications equipment, liquid helium containers, navigational equipment, electrical distribution networks and safety nets. The escaping helium gas from the liquid helium containers is used as makeup gas for the helium balloons.

As would also be obvious to one skilled in the art, the upper surfaces of all framing and all compartments are walkable and the upper surfaces of the pivot frames 4 are also climbable in either direction, up or down. Suitable utility lighting on each balloon cluster 31 is needed. Lighting for the portions of the underslung framing 38 used as walkways is with red lighting situated beneath said walkways up through translucent or clear walkways thus minimizing power usage and to preserving night vision for the occupants at night. The ability to launch grapples upwind permits limited travel upwind which is a special, and occasionally a critical, capability.

Commercial and Scientific Usage

The use of the present invention for commercial and scientific purposes requires a careful evaluation of the unusual capabilities of this novel system. Travel with the crown ballon system is much like travel with a sailing ship in complex waterways and harbors. The mindset and patience of experienced sailors is a good guide for the needed attitudes for the effective use of the system. Since mineralogical and biological sampling frequently can and should take place as a routine aspect of travel, the relatively slow rate of travel of the system, some 10 to 20 miles a day, should not be viewed as a disadvantage. Indeed, the ability to stop for short periods to obtain a drilled core sample from the earth, from the bottom of a lake or from a cliff face reflects on the unique capabilities of the system. Vegetation samples which can be collected from forest or jungle canopies can be analyzed with gamma-ray neutron analysis equipment within a few minutes and give an accurate assessment of the mineral elements in the surface soil. This is the case as the water drawn up by the roots contains representative mineral samples from the soil. This gamma-ray neutron analysis equipment has been on the market for less than 3 years and weighs only 20 pounds. The capability afforded by this analysis equipment makes the crown balloon system commercially viable. In addition, the biota collected, both botanical and zoological, can be of considerable value. The ability to systematically obtain samples from a remote region can provide a weath of information and materials for detailed analysis both onboard the system and in laboratories at other locations.

The system is a very effective camera platform which can carry flim crews and equipment to remote locations. If used as a military system, it allows for the establishment of a military presence in hostile regions that are normally inaccessible. The present invention can provide vital services in a region rendered inaccessable by a crippling disaster such as a major earthquake, flood, hurricane or volcanic eruption. With battery supplied power, electric power can be available for critical services day or night. The system can be used to sustain emergency medical groups and search and rescue operations. When weather and road conditions prevent access, the present invention can provide critical support which would otherwise be unavailable.

In general, the system can be equipped to operate in relative safety and comfort for extended periods in bad weather, day and night, over terrible terrain.

What is claimed is:

1. A load transportation device comprising:
two or more systems, having tethering interconnection means between said systems, each of said systems being a load transporting system comprised of a framed habitable structure supported at two or more points by helium filled containers, said framed structures containing retraction means and including ropes or cables whose use permits unimpeded travel of said systems from place to place by retracting said ropes or cables with said retraction means, said ropes or cables having been placed at or thrown to points at a distance from a respective said system by placement means, said ropes or cables having a grapple or sea anchor attached to their ends distal from said retraction means.

2. A load transportation device as in claim 1, wherein said retraction means is comprised of winching means.

3. A load transportation device as in claim 1, wherein said helium containers are comprised of spherical balloons.

4. A load transportation device as in claim 1, wherein said helium containers are comprised of a set of six balloons, arranged compactly in a substantially horizontal plane above each of said framed structures.

5. A load transportation device as in claim 1, wherein said helium containers are comprised of a set of six spherical balloons compactly arranged in a substantially horizontal plane above each of said framed structures, a framed structure being comprised of substantially horizontal triangular framing supported at each corner by a central balloon, and three separate outboard frames outboard of and rotatably attached to the periphery of said triangular framing, each of said separate outboard frames being supported at its distal end by a balloon.

6. A load transportation device as in claim 5, wherein said set of six spherical balloons is comprised of six spherical balloons of substantially the same size.

7. A load transportation device as in claim 5, further comprised of rotation and securement means to reposition said outboard frames and their respective balloons vertically by rotation relative to said triangular framing.

8. A load transportation device as in claim 1, wherein said framed habitable structures are comprised of at least one framed enclosed space selected from the group consisting of a storage space and a sleeping berth sized to permit fully reclined sleeping by a passenger.

9. A load transportation device as in claim 1, wherein said framed habitable structures are comprised of a framed space which encloses a lavatory having at least one of a toilet and a shower for passenger use.

10. A load transportation device as in claim 1, wherein said placement means is comprised of throwing means.

11. A load transportation device as in claim 1, wherein said placement means is comprised of transport means by one or more separate helium inflated balloons tethered by flexible attachment means to at least one of said systems.

12. A load transportation device as in claim 11, wherein said placement means further comprises means for facilitating manual placement of said grapple or sea anchor by a person supported and transported by one of said separate balloons.

13. A configuration comprised of two or more separate habitable systems interconnected by tethering means, each system of which is comprised of a framed structure supported by helium filled balloons and having solar power generating means, said framed structure having winching means affixed thereto and including ropes or cables to permit unimpeded independent travel of said configuration by the retraction of said ropes or cables by said winching means when said ropes or cables are placed at or thrown to new locations and secured thereat by grapples or sea anchors which are affixed to the ends of said cables or ropes distal from said winching means.

14. A configuration as in claim 13, wherein each of said balloons is comprised of an external spherical cover and an inner spherical helium gas barrier film.

15. A configuration as in claim 14, wherein said external spherical cover is comprised of a spherical envelope and internal support means which connect multiple points on the upper interior surface of said envelope to a central point at the bottom of said envelope.

16. A configuration as in claim 13, wherein said solar power generation means is comprised of photovoltaic cells on the surface of at least one of said balloons.

17. A system comprised of a framed structure supported by helium filled balloons and a replenishable helium means, said framed structure having winching means affixed thereto and including ropes or cables to permit travel of said system by the winching of said ropes or cables after said ropes or cables have successively been placed at or thrown to and secured at new locations, said winching means being powered by at least one of photovoltaic power means affixed to the exterior of said balloons and from battery means affixed to said framed structure.

18. A system as in claim 17, wherein said replenishable helium means is comprised of a liquid helium container and transfer means for gaseous helium from said liquid helium container to the interior of at least one of said balloons.

19. A system as in claim 18, wherein said winching means is comprised of retraction and let out means for said ropes or cables, said retraction and let out means being powered by an electric motor.

20. A system as in claim 17, wherein said framed structure is comprised of structural members or components capable of being easily disassembled into compact aggregates.

* * * * *